(12) United States Patent
Izumi et al.

(10) Patent No.: US 6,742,243 B2
(45) Date of Patent: Jun. 1, 2004

(54) COMPONENT ASSEMBLY SYSTEM

(75) Inventors: Hideharu Izumi, Wako (JP); Taizo Kitamura, Wako (JP); Masashi Shinohara, Wako (JP)

(73) Assignee: Honda Giken Kogyo Kabushi Kaisha, Tokyo (JP)

( * ) Notice: Subject to any disclaimer, the term of this patent is extended or adjusted under 35 U.S.C. 154(b) by 207 days.

(21) Appl. No.: 09/960,511

(22) Filed: Sep. 24, 2001

(65) Prior Publication Data

US 2002/0056549 A1 May 16, 2002

(30) Foreign Application Priority Data

Sep. 29, 2000 (JP) ........................................ 2000-302845

(51) Int. Cl.[7] .............................. B23P 15/26; B23Q 3/00
(52) U.S. Cl. ........................ 29/726.5; 29/468; 29/271; 29/281.4; 29/281.5; 269/43; 269/77
(58) Field of Search ....................... 29/890.03, 890.053, 29/890.07, 890.038, 464, 466, 468, 271, 281.1, 281.4, 281.5, 771, 726.5, 726; 269/43, 45, 74, 77

(56) References Cited

U.S. PATENT DOCUMENTS

| | | | |
|---|---|---|---|
| 1,541,058 A | * | 6/1925 | Lee ............................. 29/271 |
| 4,380,106 A | * | 4/1983 | Jonason ....................... 29/726 |
| 5,369,878 A | * | 12/1994 | Tsuji et al. ................. 29/281.5 |
| 5,752,312 A | * | 5/1998 | Harman et al. ............ 29/726.5 |

FOREIGN PATENT DOCUMENTS

JP    11-348123    12/1999

* cited by examiner

Primary Examiner—David P. Bryant
(74) Attorney, Agent, or Firm—Arent Fox PLLC (57) ABSTRACT

A component assembly system precisely aligns a plurality of components in a circumferential direction and assembles the components together. A plurality of guide channels extending radially from an axis are formed in a disc-shaped base member. A plurality of slide members on which the upper and lower ends of coils are mounted are supported in the guide channels in a slidable manner. The slide members are positioned so as to make contact with a circular first positioning member by moving the slide members inward along the guide channels in the radial direction and further positioned by fitting a cylindrical second positioning member around the outer periphery of the slide members. In the course of the slide members converging on the circumference of a circle having a center on the axis, the coils mounted on the slide members mesh with each other so as to be unified.

3 Claims, 9 Drawing Sheets

COMPONENT ASSEMBLY SYSTEM

DETAILED DESCRIPTION OF THE INVENTION

1. Field of the Invention

The present invention relates to a component assembly system for aligning a plurality of components on the circumference of a circle having its center on an axis and assembling them together.

2. Related Art

Japanese Patent Application Laid-open No. 11-348123 discloses an assembly system that melt-bonds two different resin tubes by pushing out a plurality of segmented members in the radial direction. The assembly system melt-bonds resin tubes having different ratios of tube wall thickness to tube diameter by forcibly moving, toward a platform, a truncated cone shaped member placed on the inside. Members formed by dividing a cylindrical body into three segments in a circumferential direction and placed on the outside are moved concurrently in radially outward directions via slide channels formed on the platform. The outer peripheries of the three segmented members are pressed against the inner periphery of the above-mentioned resin tube to position the resin tube. The surfaces of the adjoining resin tubes in contact with each other are heated to melt-bond the tubes together, thereby unifying them.

Components, such as, for example only, coiled pipes, used as heat exchangers achieve their function by being assembled together. The form of such coiled pipes is rather complicated when considering the steps necessary for assembly as well as the heat exchange efficiency of such a heat exchanger. When assembling a large number of the coiled pipes into a single unit in a state in which they are aligned in a circumferential direction, precisely assembling of the pipes is difficult unless the pipes are carefully moved inward in the radial direction toward the central axis.

Currently, a number of coiled pipes required for assembly are aligned on an adhesive tape. The adhesive tape is then manipulated into an approximately circular form so that adjoining pipes properly engage each other to form a circle. With the above-described method, it is difficult to achieve a perfect circle when a plurality of coiled pipes are assembled together, which is a reason that unwanted variations in the size of the circular formation occur easily. When assembling the above-mentioned pipes so their coiled sections mesh with each other, each pipe moves in a different direction from the other pipes leading to the extremities of each pipe being misaligned relative to the other pipes when assembled together.

SUMMARY OF THE INVENTION

It is an object of this invention to overcome the above-described drawbacks of the related art.

It is also an object of this invention to provide a component assembly system that precisely aligns and assembles a plurality of components together in the circumferential direction.

In order to achieve the above-mentioned objects, the invention provides a component assembly system for aligning a plurality of components along the circumference of a circle having its center on an axis and assembling the components together. The system includes a base member having a plurality of guides extending in a radial manner from the axis. A plurality of slide members are slidably supported on the guides of the base member and have a first contact-receiving surface facing the axis. Support members support the components on the slide members in a detachable manner. A first positioning member is placed inside the group of slide members and contains a first contact surface on an outer periphery thereof with a center on the axis. The group of slide members supporting the components are moved inward in the radial direction along the guides of the base member. The first contact-receiving surfaces of the slide members contact the first contact surface of the first positioning member so the components supported on the respective slide members are assembled together.

In accordance with the above-mentioned arrangement, since the group of slide members supporting the components are moved inward in the radial direction along the guides of the base member, components with complicated shapes can reliably be assembled by moving the components toward the axis along correct routes. Moreover, since the first contact-receiving surfaces of the slide members make contact with the first contact surface of the first positioning member, the group of slide members are correctly positioned along the circumference of a circle, thereby enhancing the precision with which the components are assembled.

Furthermore, the component assembly system may also include a second positioning member that can be fitted around the outside of the group of slide members whose first contact-receiving surfaces are in contact with the first contact surface of the first positioning member. The second positioning member has, on an inner periphery, a circular second contact surface having a center on the axis. The second contact surface of the second positioning member contacts the second contact-receiving surfaces formed on the slide members so as to face away from the axis.

In accordance with the above-mentioned arrangement, since the first contact-receiving surfaces of the slide members make contact with the first contact surface of the first positioning member and, subsequently, the second contact surface of the second positioning member makes contact with the second contact-receiving surfaces of the slide members by fitting the second positioning member around the outside of the group of slide members, positioning is more precisely executed by interposing the group of slide members between the first and second positioning members, thereby enhancing the precision with which the components are assembled together.

Furthermore, the component assembly system may also provide the slide members with a support part for supporting one end of the corresponding component and a positioning part for positioning the component in the axial direction. Also, the other end of the component is supported by the support member, which is detachable from the slide member.

In accordance with the above-mentioned arrangement, the attitude of the component is stabilized by supporting the two ends thereof. Additionally, the assembled components are easily be removed merely by separating the support member from the slide member. Moreover, since the positioning parts are provided on the slide members, the components are positioned in the axial direction to enhance the precision of assembly.

These and other objects of the invention will be described in or be apparent from the following description of the exemplary embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENT

Figure 5:
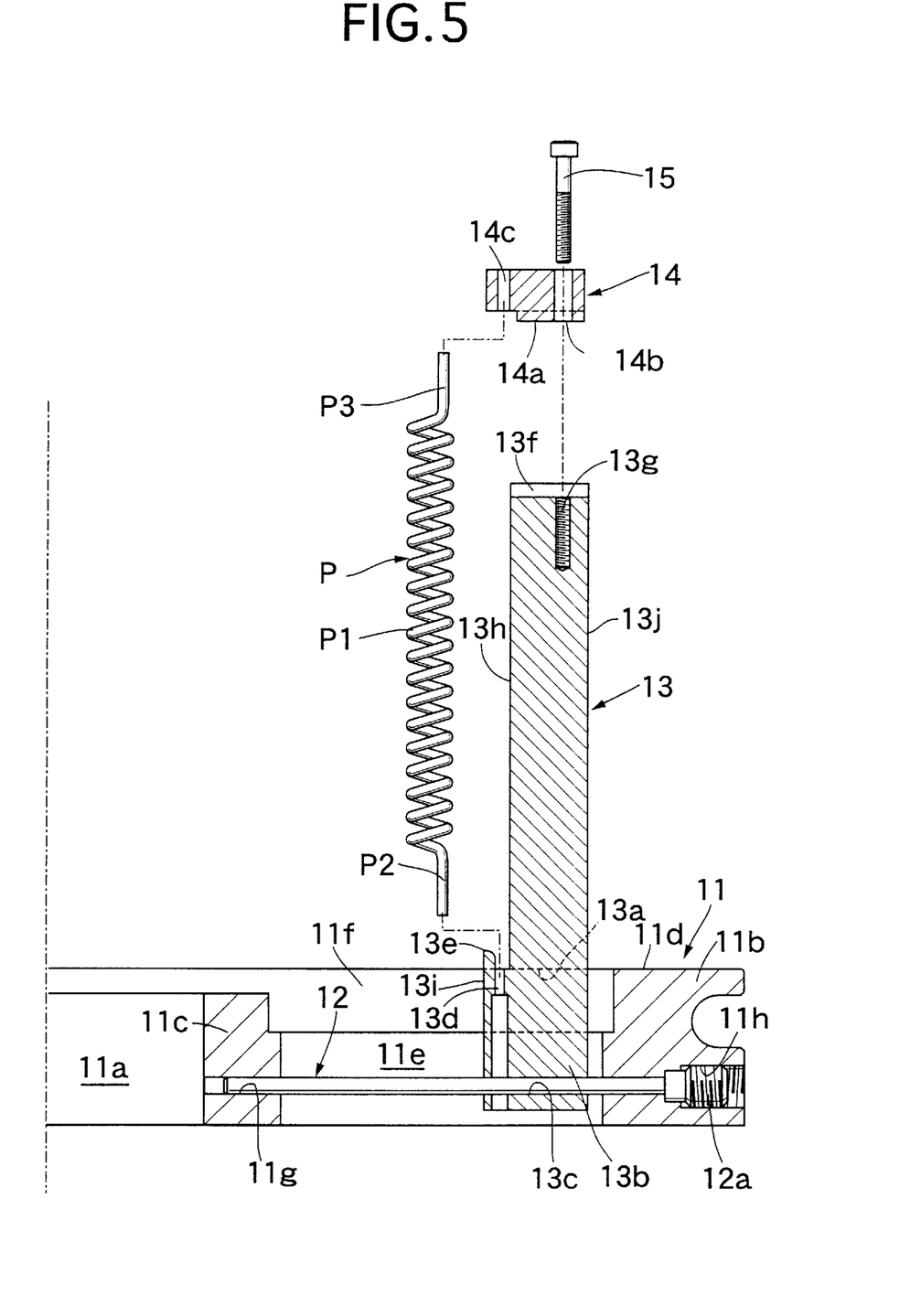
FIG. 5 is a partially exploded view of FIG. 2.
Figure 7:
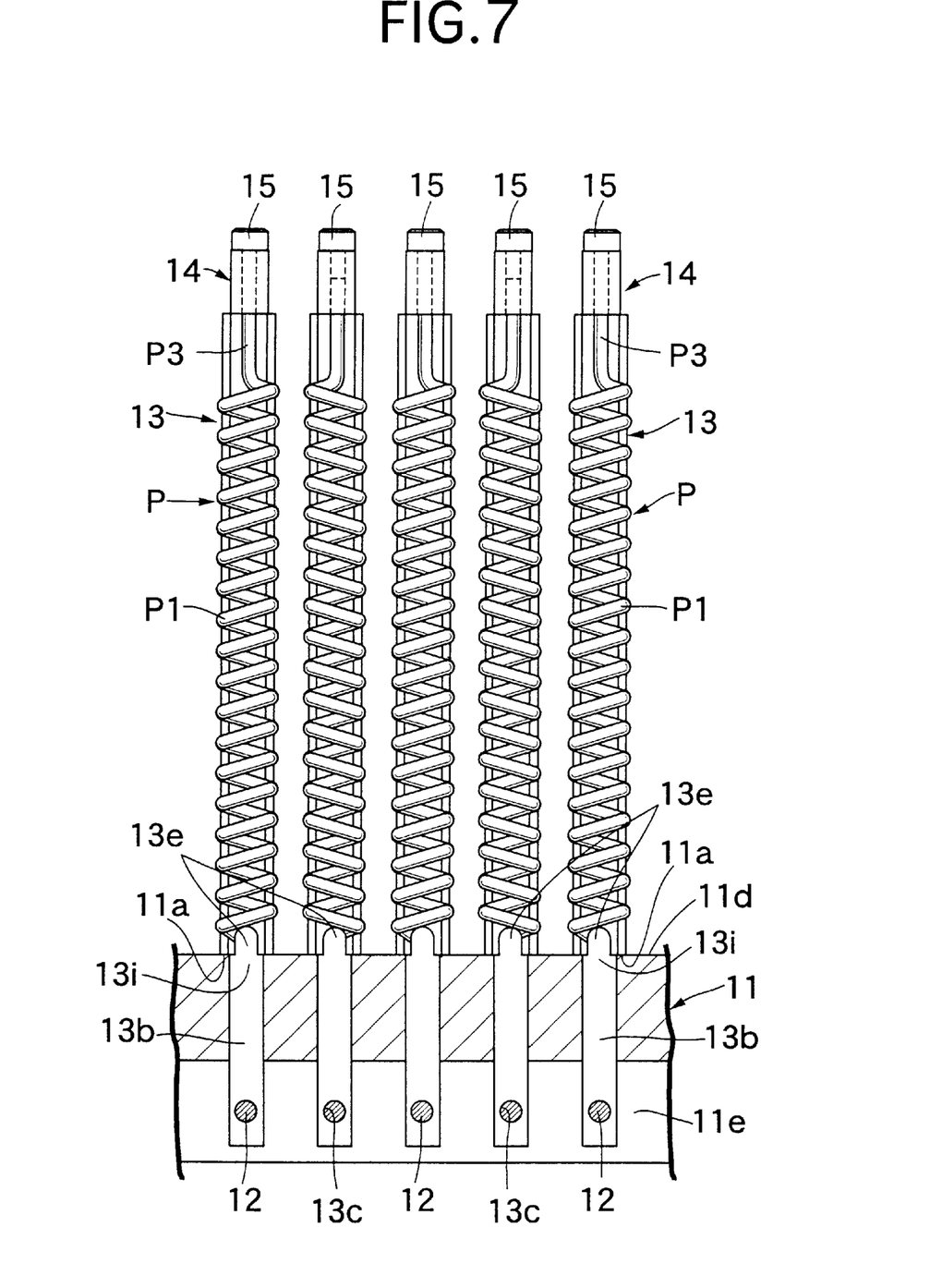
FIG. 7 is a view from line 7—7 in FIG. 6.

Referring to FIGS. 5 and 7, pipes P are assembled by a component assembly system. The pipes P are used, for example, for an evaporator of a system, such as, for example, a Rankine cycle system. The pipes P include a coiled main body P1 and a pair of connecting parts P2 and P3 extending linearly from the two ends of the main body P1. The pair of connecting parts P2 and P3 are positioned coaxially relative to each other but are offset relative to the center of the main body P1. The direction in which the main body P1 of the pipe P is wound can be right-handed or left-handed, and adjoining pipes P are wound in directions opposite to each other so they engage with each other.

Turning to FIGS. 1 to 5, the component assembly system of the present embodiment aligns a plurality of the above-mentioned pipes P along the circumference of a circle to assemble the pipes P into a single unit. The system includes a disc-shaped base member 11. A circular opening 11a having a center on an axis L is formed on the base member. The base member 11 has an outer peripheral wall 11b, an inner peripheral wall 11c, an upper wall 11d and an annular recess 11e surrounded by the walls. On the upper wall 11d of the base member 11 are formed sixty guide channels 11f extending radially from the axis L. Sixty guide rods 12 respectively corresponding to the above-mentioned guide channels 11f are placed in the annular recess 11e of the base member 11. On one end of each guide rod 12 is formed a male thread 12a, and the other end thereof is fitted into a support hole 11g formed in the inner peripheral wall 11c of the base member 11. The above-mentioned male thread 12a threadably engages a female thread 11h formed in the outer peripheral wall of the base member 11. The guide channel 11f and the guide rod 12, which form a pair, are arranged in parallel to each other. Guide channels 11f and guide rods 12 correspond to the guides, support holes 13d correspond to the support part, and pipes P correspond to the components of the present invention.

Sixty slide members 13 are supported on the base member 11. Each slide member 13 slides in a radial direction with the axis L in the center while being guided by the corresponding guide channel 11f and the guide rod 12. That is to say, a guide section 13b formed in a lower part of the slide member 13 by way of a step 13a passes through the guide channel 11f of the base member 11. Also, the guide rod 12 passes through a guide hole 13c formed in a lower end of the guide section 13b. Engagement of the guide rod 12 with the guide hole 13c prevents the slide member 13 from falling down in the radial direction, and contact between the steps 13a and the upper face of the upper wall 11d prevents the slide member 13 from falling down in the circumferential direction. Thus, the slide member 13 slides while standing upright relative to the base member 11.

Figure 1:
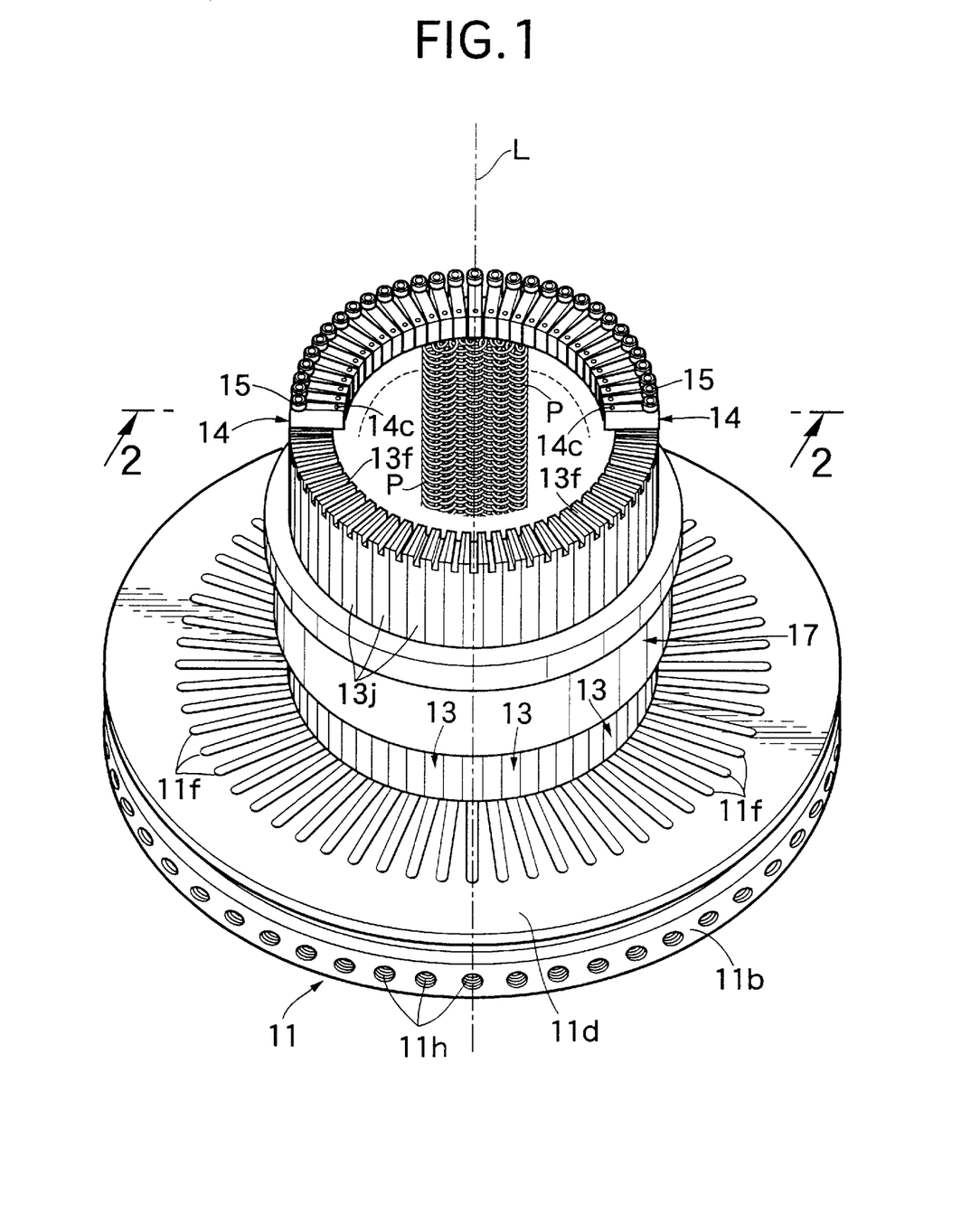
FIG. 1 is a perspective view showing a state of a component assembly system after the components have been assembled.
Figure 2:
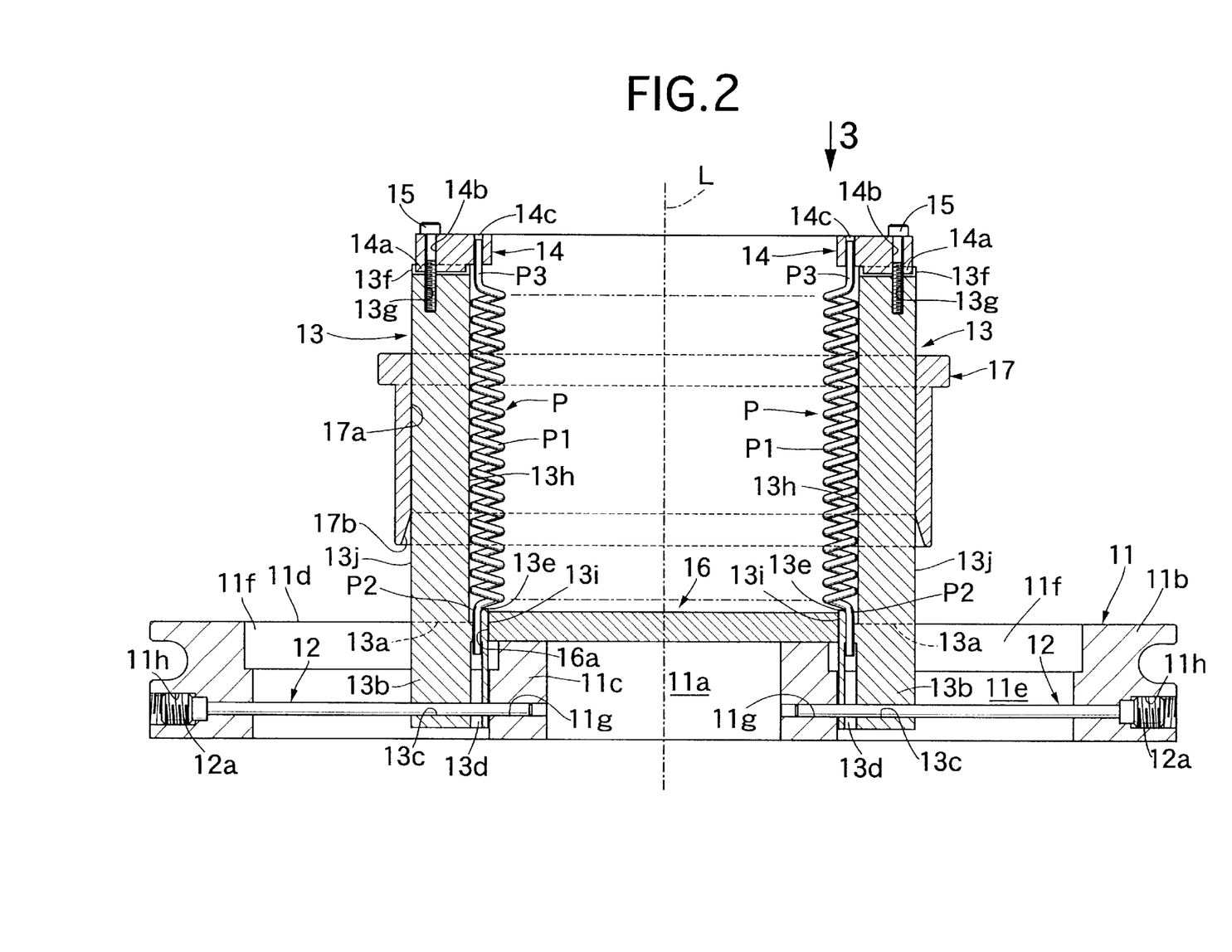
FIG. 2 is a cross section at line 2—2 of FIG. 1.

In the lower part of the slide member 13 are formed a support hole 13d into which the connecting part P2 at the lower end of the pipe P is fitted and a positioning part 13e for supporting the lower end of the main body P1 of the pipe P and positioning the pipe P in the vertical direction. A groove 13f and a female thread 13g opening within the groove 13f are formed on an upper face of the slide member 13. A support member 14 is fixed to the slide member 13 by a bolt 15 running through a bolt hole 14b in the support member 14 in a state in which a protruding section 14a formed on a lower face of the support member 14 is fitted in the groove 13f of the slide member 13. The clearance between the bolt 15 and the bolt hole 14b can be set at more than 0.5 mm, but in the present embodiment it is preferred to be set at less than 0.5 mm. A support hole 14c into which the upper end of the pipe P, or the connecting part P3, is fitted is formed in the support member 14. A side of the main body P1 of the pipe P supported by the slide member 13 is in contact with a support surface 13h formed on the slide member 13 so as to face the axis L.

Figure 3:
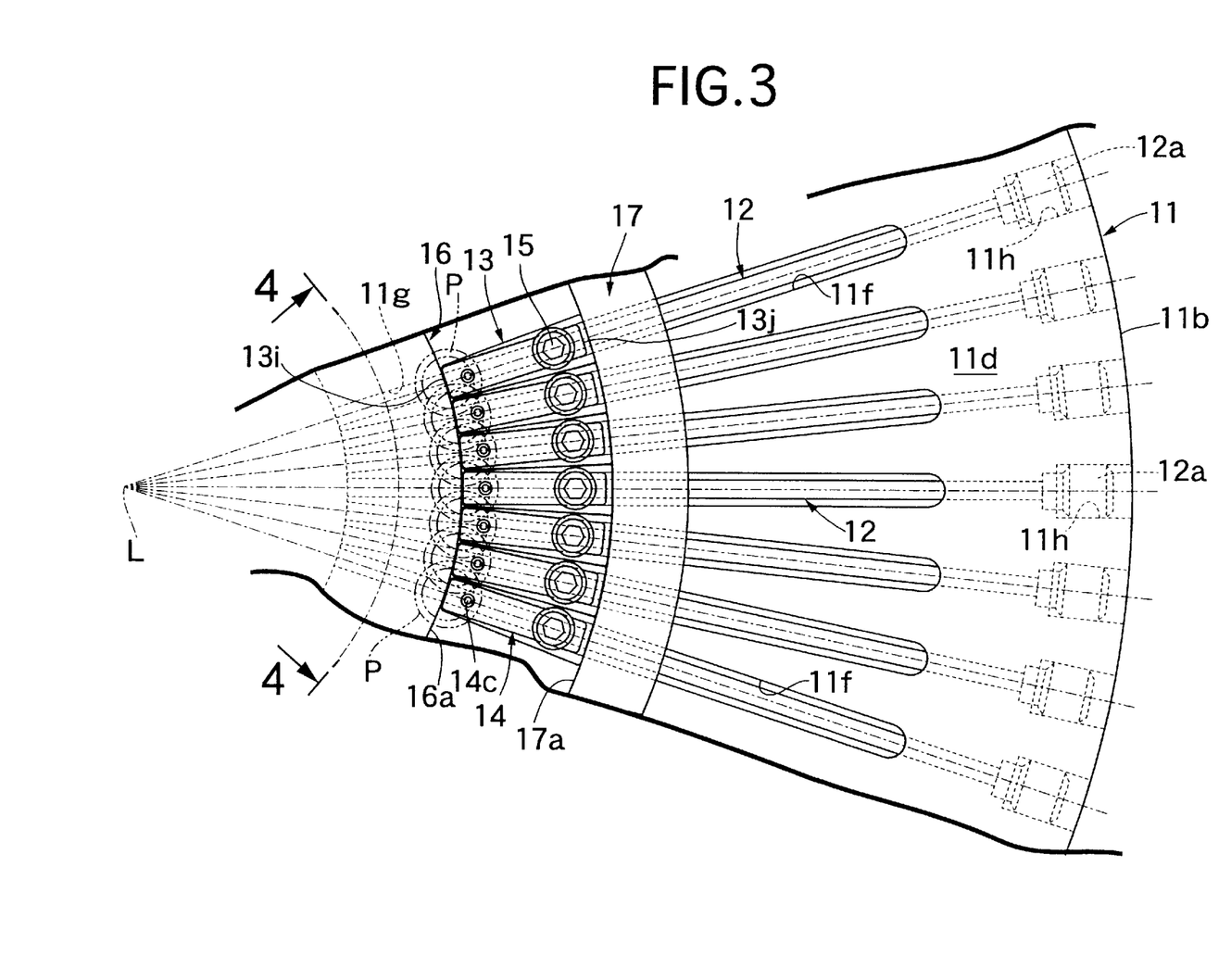
FIG. 3 is a view from arrow 3 in FIG. 2.
Figure 4:
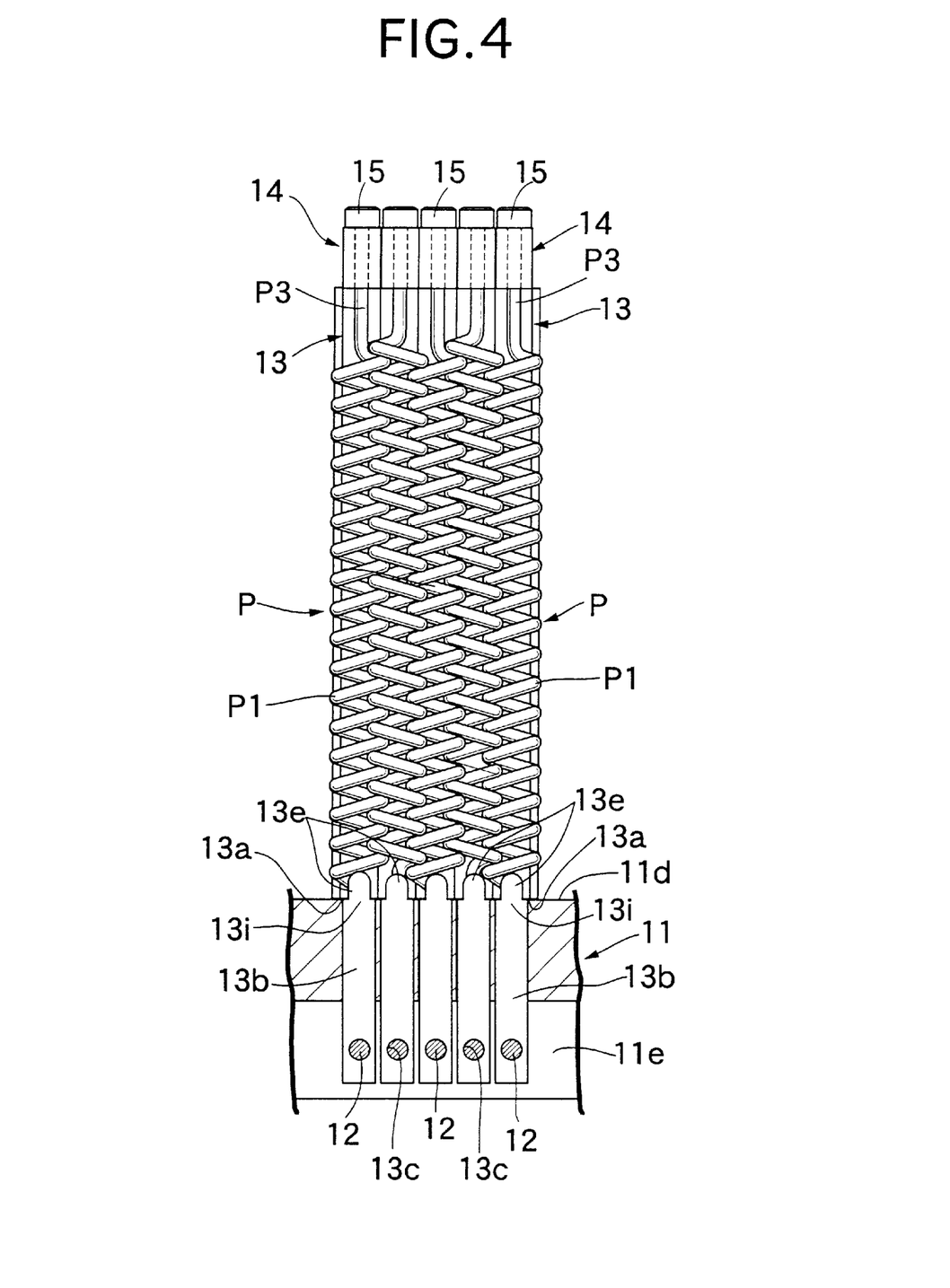
FIG. 4 is a view from line 4—4 in FIG. 3.

The slide members 13 are formed by dividing a cylindrical member into sixty segments having a central angle of 6°. A cylinder is formed by combining the sixty slide members 13.

A disc-shaped first positioning member 16 is placed, in a detachable manner, on an upper face of the inner peripheral wall 11c of the base member 11. A first contact surface 16a formed on the outer periphery of the first positioning member 16 contacts a first contact-receiving surface 13i formed on a lower part of the slide member 13 so as to face the axis L. A cylindrical second positioning member 17 is fitted around the outer periphery of a cylindrical assembly containing the sixty slide members 13. When so fitted, a second contact surface 17a on the inner periphery of the second positioning member 17 is in contact with second contact-receiving surfaces 13j of the slide members 13 that face away from the axis L. A tapered face 17b is formed on the inner periphery in a lower part of the second positioning member 17 for ease of fitting.

Next, the operation of the preferred embodiment of this invention having the above-mentioned arrangement is explained.

The slide members 13 with the support members 14 detached therefrom are moved, in advance, to the radially outer end of the guide channels 11f of the base member 11. The respective connecting parts P2 at the lower ends of the pipes P are fitted in the support holes 13d of the slide members 13. The support members 14 with the connecting parts P3 at the upper ends of the pipes P fitted into the support holes 14c are fixed to the upper ends of the slide members 13 by the bolts 15 (FIG. 7).

As shown in FIG. 7, any two adjacent pipes P supported by the slide members 13 are wound in opposite directions relative to each other. The pipes P supported by the slide members 13 are positioned in the direction of the axis L (the vertical direction) by contact of the lower ends of the coiled main bodies P1 with the positioning parts 13e of the slide members 13. As shown in FIG. 2, the connecting parts P2 and P3 are offset relative to the centers of the main bodies P1. Contact of the sides of the main bodies P1 near the connecting parts P2 and P3 with the support surfaces 13h of the slide members 13 roughly determines the positions of the pipes P in the rotational direction. At this point, the two types of pipe P with winding directions opposite relative to each other are displaced by half a pitch of the coil in the direction of the axis L so they can mesh with each other (FIG. 7).

Figure 6:
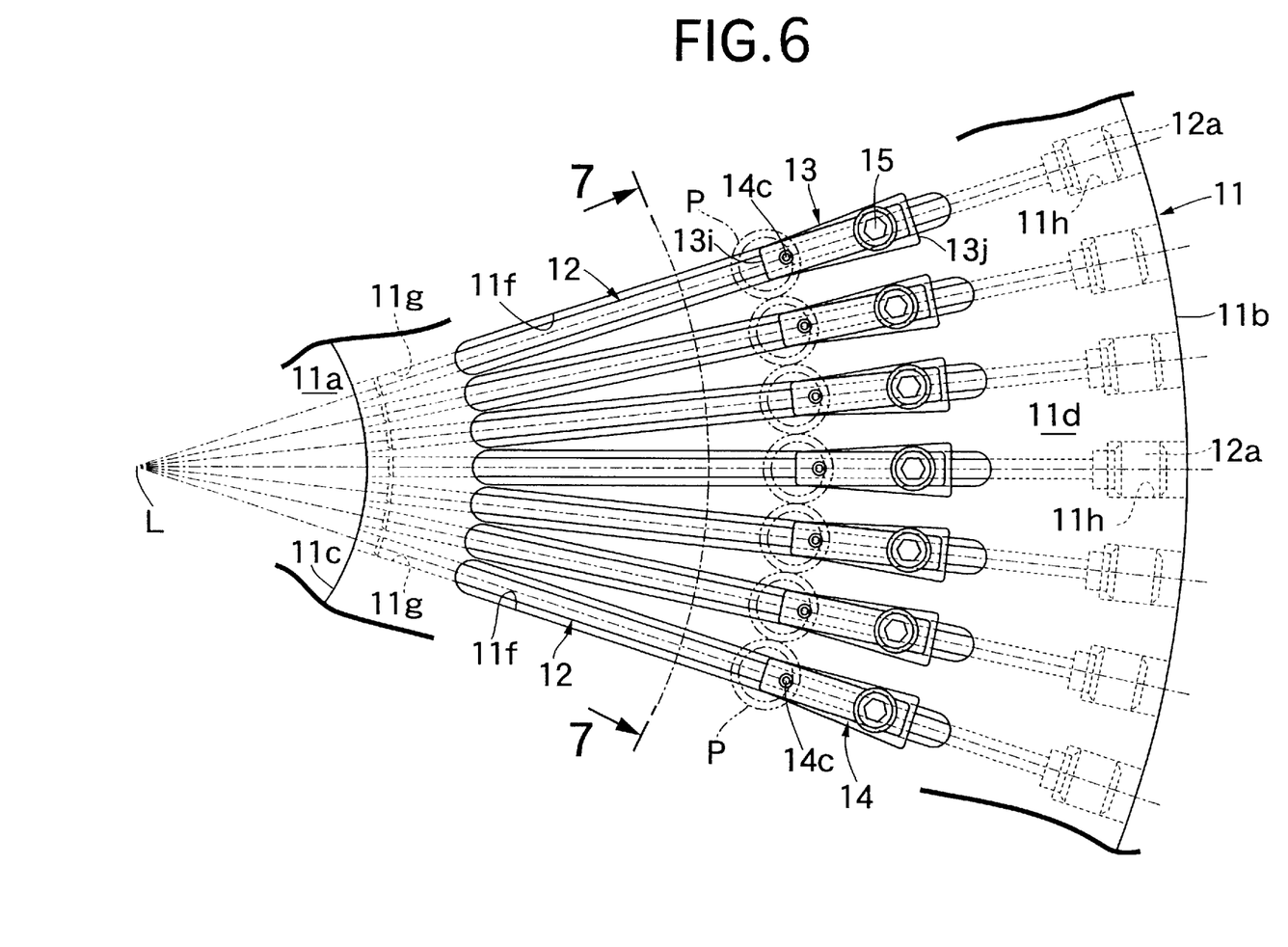
FIG. 6 is a diagram for explaining an action corresponding to FIG. 3.

Subsequently, each slide member 13 is manually slid along the guide channels 11f and the guide rods 12 so as to converge on the axis L. During this process, the main bodies P1 of adjoining pipes P wound in directions opposite relative to each other start to mesh with each other. In a state in which the first contact-receiving surfaces 13i of the slide members 13 are in contact with the first contact surface 16a on the outer periphery of the first positioning member 16, the cylindrical second positioning member 17 is fitted around the outer peripheries of the slide members 13 from above. As a result, the first contact-receiving surfaces 13i on the radially inner sides of the slide members 13 are in close contact with the first contact surface 16a of the first positioning member 16, and the second contact-receiving surfaces 13j on the radially outer side of the slide members 13 are in close contact with the second contact surface 17a of the second positioning member 17. The sixty slide members 13 are correctly positioned along the circumference of a circle as well as along a circle in a state in which they are assembled together.

Figure 8:
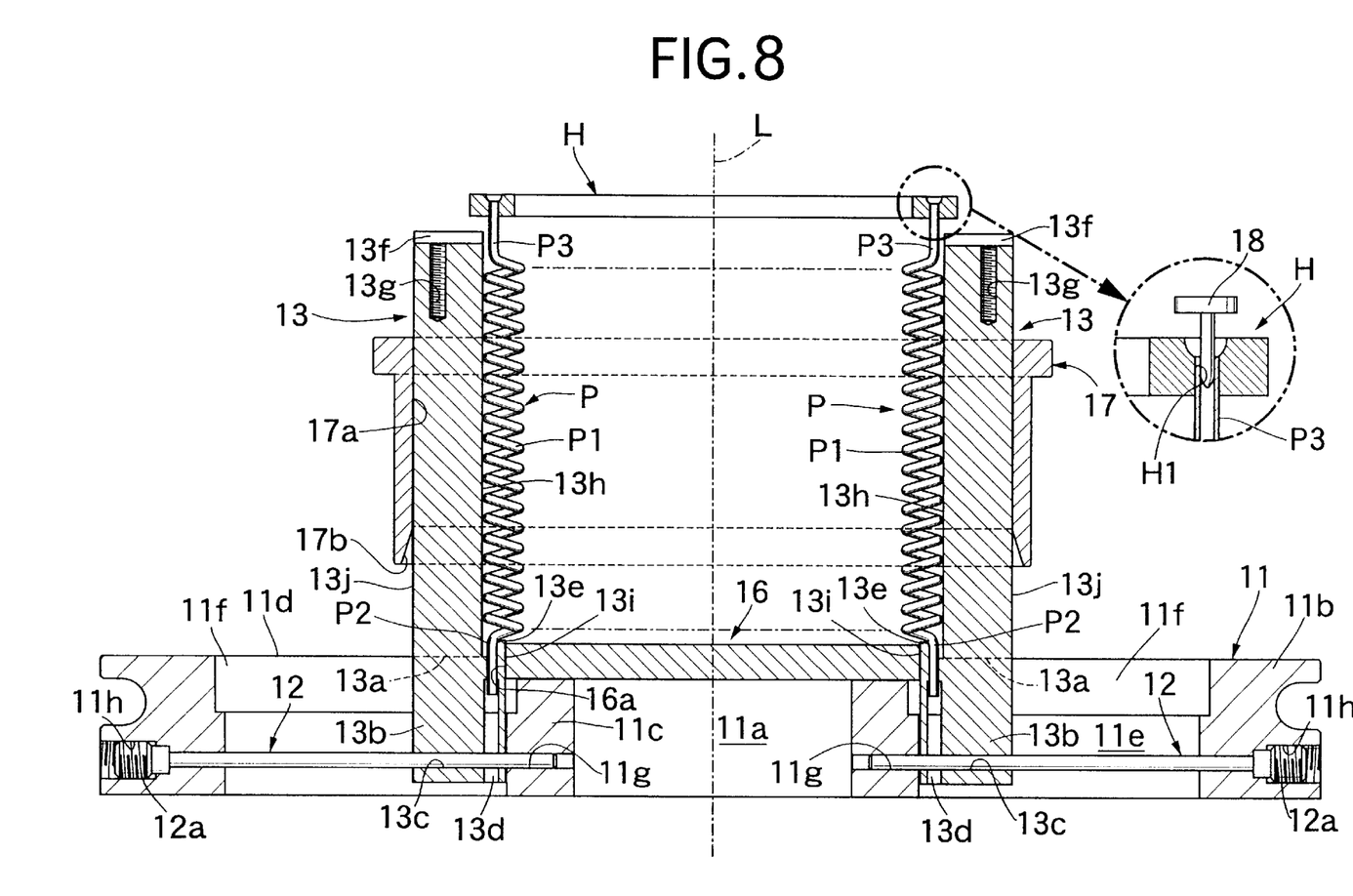
FIG. 8 is a diagram showing a state in which pipes are assembled in a header.

Subsequently, as shown in FIG. 8, the support members 14 are removed from the upper ends of the slide members 13 and the connecting parts P3 of the sixty pipes P are fitted in mounting holes H1 of an annular header H. In order to smoothly fit the connecting parts P3 in the mounting holes H1, guide pins 18 are inserted beforehand into the mounting holes H1 so the connecting parts P3 and the header H can be mounted onto the pipes P smoothly along these guide pins 18.

Figure 9:
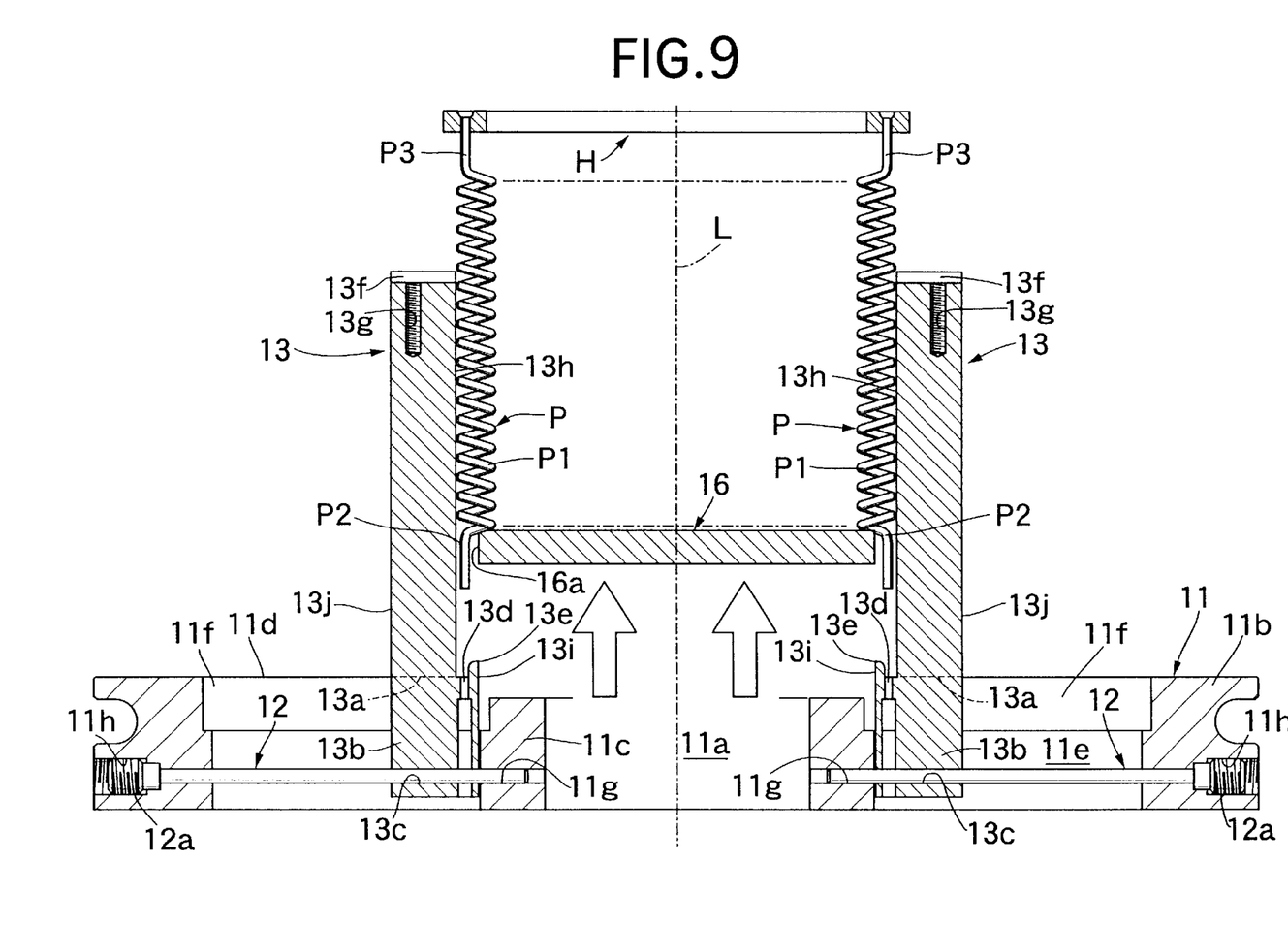
FIG. 9 is a diagram showing a state in which the pipes and header that have been unified are removed from a component assembly system.

Next, as shown in FIG. 9, the first positioning member 16 is pushed upward through the opening 11a of the base member 11 to allow the integrated pipes P and header H to be removed from the inside of the slide members 13. During the course of this process, the first positioning member 16 presses against the lower ends of the main bodies P1 of the pipes P, facilitating the pipes P being positioned and oriented in the direction of the axis L. The connecting parts P2 of the pipes P are then fitted in mounting holes H1 of another header H in the aforementioned manner using guide pins 18. The pipes P and two headers H are joined together by brazing.

As is clear from FIG. 5, by loosening the male thread 12a of the guide rod 12 and pulling the male thread out of the base member 11, the slide member 13 is easily removed from the guide channel 11f of the base member 11. It is therefore possible to assemble different types of pipes along the circumference of a circle having a different diameter by employing slide members 13, first positioning member 16 and second positioning member 17 having appropriate sizes. In this case, the number of slide members 13 can be reduced to thirty, twenty, fifteen or ten, which are submultiples of sixty, according to the number of pipes that are to be assembled.

As hereinbefore described, since the pipes P supported by the slide members 13 are moved in a radial direction along the guide rods 12 and the guide channels 11f of the base member 11 so as to assemble the pipes P into one unit, the pipes P can be converged in a stable attitude and reliably assembled. Positioning is carried out by the first and second contact-receiving surfaces 13i and 13j formed on the slide members 13 making contact with the first contact surface 16a of the first positioning member 16 and the second contact surface 17a of the second positioning member 17. Then, the slide members 13 are placed on the circumference of an exact circle having a center on the axis L and the pipes are precisely assembled.

Moreover, since the slide members 13 support the upper and lower ends of the pipes P, pipes P having an unstable shape and easily deformable are supported in a stable attitude and assembled precisely. In particular, since the support members 14 supporting the upper ends of the pipes P are detachable from the slide members 13, the assembled pipes P are easily removed by detaching the support members 14 from the slide members 13. Furthermore, since the lower parts of the main bodies P1 of the pipes P are supported by the positioning parts 13e provided on the slide members 13, the pipes P are positioned in the direction of the axis L, thus enhancing the precision of assembly.

While the invention has been described above in conjunction with a preferred embodiment, it is evident that the invention can be modified in a variety of ways without departing from the spirit and scope of the invention.

For example, in the embodiment coiled pipes P are illustrated as the components, but the present invention can be applied to any other type of component.

Furthermore, in the embodiment sixty components are assembled into one unit, but any suitable number is considered to be within the scope of the invention.

Moreover, the components are assembled over a span of 360°, but can be assembled over a range of less than 360°.

Further, slide members 13 and second positioning member 17 are manually driven, but it is also possible to drive them using a drive source such as a motor or a cylinder using pneumatic or hydraulic pressure. Moreover, the guide rod 12 can be formed from a slide gear and engagement thereof with the slide member 13 can drive the slide member 13.

Furthermore, in the embodiment the routes along which the slide members 13 slide are on a plane perpendicular to the axis L, but these routes can be out of the above-mentioned plane.

Accordingly, the preferred embodiment of the invention as set forth herein is intended to be illustrative, not limiting. Various changes may be made without departing from the spirit and scope of the invention.

What is claimed is:

1. A component assembly system for aligning a plurality of components on a circumference of a circle having a center on an axis and assembling the components together, comprising:

a base member having a plurality of guides extending in a radial manner from the axis;

a plurality of slide members slidably supported on the guides of the base member and having a first contact-receiving surface facing the axis;

support members for supporting the components on the slide members in a detachable manner; and a first positioning member placed inside the group of slide members and having on an outer periphery a first contact surface having a center on the axis;

wherein the group of slide members supporting the components are moved inward in a radial direction along the guides of the base member, and the first contact-receiving surfaces of the slide members make contact with the first contact surface of the first positioning member so that the components supported on the respective slide members are assembled together.

2. The component assembly system according to claim 1, further comprising:

a second positioning member fitted around an exterior of the group of slide members whose first contact-receiving surfaces are in contact with the first contact surface of the first positioning member, the second positioning member including, on an inner periphery, a circular second contact surface having a center on the axis, and the second contact surface of the second positioning member contacting second contact-receiving surfaces formed on the slide members so as to face away from the axis.

3. The component assembly system according to either one of claim 1 or 2, wherein the slide members have a support part for supporting one end the corresponding component and a positioning part for positioning the component in an axial direction, and the other end of the component is supported by the support member, which is detachable from the slide member.

* * * * *

UNITED STATES PATENT AND TRADEMARK OFFICE
CERTIFICATE OF CORRECTION

PATENT NO. : 6,742,243 B2 Page 1 of 1
DATED : June 1, 2004
INVENTOR(S) : Izumi et al.

It is certified that error appears in the above-identified patent and that said Letters Patent is hereby corrected as shown below:

<u>Title page,</u>
Item [73], Assignee, should read -- Honda Giken Kogyo Kabushiki Kaisha, Tokyo (JP) --.

Signed and Sealed this

Twentieth Day of July, 2004

JON W. DUDAS
*Acting Director of the United States Patent and Trademark Office*